United States Patent [19]
Atkinson et al.

[11] Patent Number: 5,881,228
[45] Date of Patent: Mar. 9, 1999

[54] EFFICIENT MESSAGE PROCESSING USING A MULTI-PORTED RAM AND A DEDICATED MICROCONTROLLER

[75] Inventors: Michael Atkinson, Irvine; Dilip C. Shah, Laguna Hills; James Whitehouse, Brea; Kouwei Shen, Newport Coast, all of Calif.

[73] Assignees: Sony Corporation, Tokyo, Japan; Sony Trans Com, Inc., Irvine, Calif.

[21] Appl. No.: 705,128

[22] Filed: Aug. 29, 1996

[51] Int. Cl.$^6$ .............................. G06F 15/00; H04J 3/16
[52] U.S. Cl. ................... 395/200.14; 395/200.44
[58] Field of Search .......... 395/200.04, 200.41, 395/200.43, 200.44; 364/243, 228.1, 230, 242.3; 370/218, 216

[56] References Cited

U.S. PATENT DOCUMENTS

5,440,746   8/1995   Lentz ...................................... 395/163
5,532,958   7/1996   Jiang et al. ............................ 365/154
5,568,484   10/1996  Margis .................................... 370/85.5

*Primary Examiner*—Kamini Shah
*Attorney, Agent, or Firm*—Blakely, Sokoloff, Taylor & Zafman LLP

[57] ABSTRACT

A communication subsystem used in an aircraft entertainment system employs a microcontroller and a dual-ported RAM to relieve burden from the host processor in handling low-level operations in communicating with external devices. The host processor and the microcontroller accesses the dual-ported RAM by testing the semaphore to determine if the DPRAM is available. If available, the processor and/or the microcontroller will read/write the messages from/to the DPRAM as appropriate. The microcontroller controls the communication interface controllers directly and will send messages read from the DPRAM to the CICs or write to the DPRAM messages received from the CICs without host processor's intervention. The microcontroller also performs other low-level operations such as header/trailer processing and error checking/correcting free from the host processor.

19 Claims, 6 Drawing Sheets

| Address | Section | Ref |
|---|---|---|
| 0000 – 00FF | CONTROL BUFFER | 71 |
| 0100 – 031F | VRU1 (EXTERNAL DEVICE 1) | 72 |
| 0320 – 053F | VRU2 (EXTERNAL DEVICE 2) | 73 |
| 0540 – 075F | VRU3 (EXTERNAL DEVICE 3) | 74 |
| 0760 – 097F | AMUX (EXTERNAL DEVICE 4) | 75 |
| 0980 – 089F | SVDU (EXTERNAL DEVICE 5) | 76 |
| 0BA0 – 0FFF | UNUSED | 77 |

| BYTE 1 | BYTE 2 | BYTE 3 TO n |
|---|---|---|
| MESSAGE LENGTH || MESSAGE |

FIG. 6A

| BYTE 1 | BYTE 2 | BYTE 3 | BYTE 4 | BYTE 5 TO n |
|---|---|---|---|---|
| PARITY ERROR | RX CHECKSUM | MESSAGE LENGTH || MESSAGE |

FIG. 6B

EFFICIENT MESSAGE PROCESSING USING A MULTI-PORTED RAM AND A DEDICATED MICROCONTROLLER

BACKGROUND OF THE INVENTION

1. Field of the Invention

This invention relates to architecture of a communication subsystem used in In-Flight Entertainment Systems on aircraft. In particular, the invention relates to the use of a dual-ported RAM and a microcontroller to streamline the communication activities between peripheral subsystems and a host processor.

2. Description of Related Art

In-Flight Entertainment Systems (IFES) are now becoming popular on commercial aircraft. A typical new IFES may offer a variety of services including music, news, movies, video on demand, telephone, and games to passengers right at the passengers' seats with the convenience of individualized control. A timetable is generally provided from which a passenger may choose options when he or she requests services. Such a system involves a large number of interconnections to various peripheral subsystems. The communication between these subsystems and the main processor (or the host processor) can be quite complex. A host processor, referred to as a System Control Unit (SCU), communicates with a large number of external Line Replacement Units (LRUs) for various operational and control functions, as overhead display, video and audio control. In addition to maintaining and managing a large communication load, the host processor also has to perform its own tasks. The communication problem is even more severe when the host processor is required to process error information and/or other ancillary data as part of the communication messages.

To solve this problem, a system may employ either an interrupt or polling communication scheme. In an interrupt scheme, the peripheral subsystem generates a request signal to the host processor to interrupt the host and request service. This interrupt mechanism may be sufficient when the number of peripheral subsystems is small and the host has a relatively light workload. However, when there is a significant number of peripheral subsystems that need to communicate with the host and the host itself has to perform a large number of operations, the interrupt scheme is unsatisfactory. The host becomes overloaded with too many interrupt requests resulting in the situation that the host cannot timely respond to all requests, and/or acquire the time to perform other tasks.

In a polling scheme, the host determines whether a peripheral device needs service by checking certain status information that indicates whether a peripheral device requires service. By polling, the host is able to control when the status is checked and therefore when the service is performed. However, if the host does not check the status frequently enough, many requests may be pending concurrently thus creating a long waiting time. The problem is further compounded when the system includes a large number of devices requesting service as peripheral devices operate at slow data transfer rates.

In a typical prior art IFES architecture, the host processor interfaces to a group of Communication Interface Controllers (CICs) through the host bus. The Communication Interface Controller may be one of a variety of communication interfacing devices such as the Universal Asynchronous Receiver and Transmitter (UARTs). The CICs are connected to the corresponding external devices. If an interrupt mechanism is implemented, CICs generate interrupt signals which usually go to an interrupt controller. The interrupt controller resolves the priority and processes the interrupt requests to produce a host interrupt signal connected to the interrupt request of the host processor. The host processor and the external devices may exchange messages using an interrupt or polling mechanism. Both the interrupt and polling schemes operating in this manner have the following disadvantages:

1) The host spends too much time checking the status (for polling) or responding to interrupt service routines. When the number of external devices increases or the size of the messages is large, the host is busy communicating with these devices and does not have the time to perform its own tasks.

2) The CIC itself can only either transmit or receive, not both simultaneously because the host can only read or write at any point in time. Therefore, when the host and the external device send messages to each other, there will be some delay or a buffering mechanism is needed to temporarily store the messages.

The above disadvantages result in degraded performance of the IFES. A passenger in a crowded aircraft, for example, may perceive slow responses to his or her requests. A video program may be interrupted frequently. An on-going game may be suspended.

It is therefore desirable to have a system to act as a communication handler which manages the communication load to relieve the burden from the host processor and at the same time can process the messages to and from the host in an efficient manner.

SUMMARY OF THE INVENTION

In an In-Flight Entertainment Systems (IFES), a communication board acts as the communication manager for the host processor. This communication manager interfaces to the communication buses from various external devices or subsystems such as the Line Replacement Units (LRUs). The communication manager includes a microcontroller that is used to off-load the processing required to generate the necessary low-level protocols used in the various LRUs. The microcontroller acts as an intermediary between the host processor and the LRUs. It accesses the communication buses connected to the LRUs directly through its own input/output ports. The result is efficient management and processing of messages to reduce traffic on communication buses when passengers' demand is at a heavy level.

The microcontroller and the host processor exchange messages through a dual-ported RAM (DPRAM). Each external device is allocated a memory space in the DPRAM. When the host processor sends a message to an external device, it writes the message to the assigned memory area in the DPRAM and sets an appropriate flag to alert the microcontroller. Once alerted, the microcontroller reads the message from the DPRAM and builds the complete communication message to comply with the specific bus protocol requirements such as headers, trailers, checksums and other error detection and correction data. The microcontroller then sends the message in the proper format to the external device. When an external device sends a message to the host, the message is received by the microcontroller. The microcontroller processes the message to check for errors and to remove overhead data such as headers and trailers. The raw message is then written into the corresponding memory area in the DPRAM and a flag is asserted by the microcontroller to inform the host processor that a message is waiting in the DPRAM. The host processor then accesses the message without having to perform the necessary processing associated with extracting a message.

The host processor and the microcontroller communicate through the setting and resetting of various flags on the DPRAM. These flags are used in several situations such as to inform the host or the microcontroller that data are available in the DPRAM, or to inform that an error condition has occurred. Contentions in memory usage can be resolved using a semaphore mechanism. In addition, the host processor and the microcontroller send status information to each other to inform the status of a message stored in the DPRAM.

BRIEF DESCRIPTION OF THE DRAWINGS

The objects, features and advantages of the present invention will become apparent from the following detailed description of the present invention in which.

DESCRIPTION OF THE PRESENT INVENTION

The present invention discloses a method and a subsystem used in in-flight entertainment systems (IFES) for efficiently managing and processing communication messages between a host processor and external devices in providing services to aircraft passengers. A microcontroller serves as an intermediary processor between the host processor and external devices. The microcontroller interfaces to the external devices through a set of communication interface controllers and to the host processor through a dual-ported Random Access memory (DPRAM). Using a semaphore mechanism, the microcontroller and the host access the Dual-Ported RAM in an asynchronous manner to retrieve and deposit messages without significant delay times. In addition, the host processor is relieved of the burden to perform the low-level operations on the messages. As a result, passengers receive faster response time and entertainment services without noticeable degradation.

Figure 1:
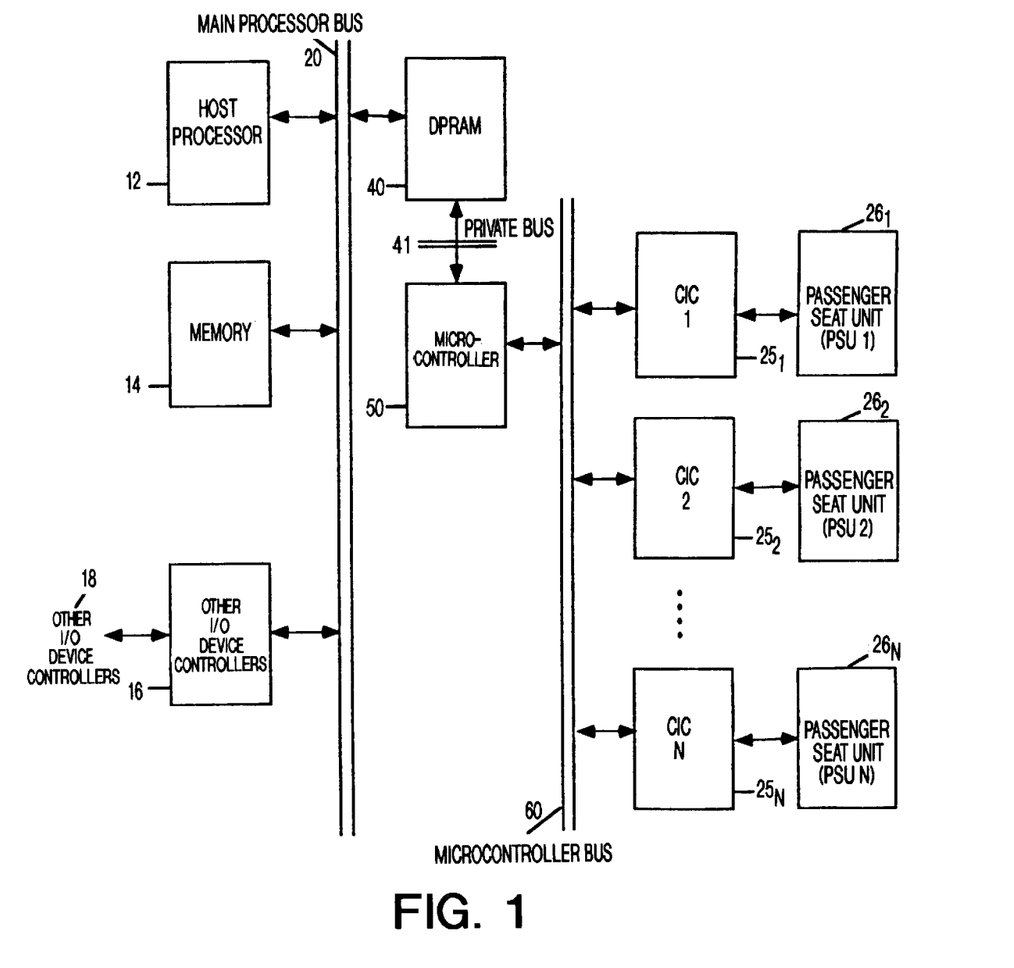
FIG. 1 is a block diagram illustration of one embodiment of a system that operates in accordance with the teachings of the present invention.

FIG. 1 is an illustration of one embodiment of the present invention. The IFES includes host processor 12 which controls many of the basic operations of the IFES. These operations are associated with the controlling and monitoring of a number of video and audio entertainment devices and/or subsystems installed at the passengers' seats. Some examples of these subsystems, or external devices, are Video Receiver Unit (VRU), Audio Multiplexer Unit (AMUX), and Smart Video Distribution Unit (SVDU). These external devices or subsystems are referred to as Passenger Seat Units (PSUs).

The VRU is a video tape recorder/player that is used to produce video programs recorded in video tapes. The control and monitor operations for the VRU include stop, start, fast forward, rewind, etc. These control and monitor operations are carried out through the communication pathway connecting the VRU and the CIC. Typically, there are a multiple of VRUs available at each passenger seat to allow the passenger to select the desired video program.

The AMUX is an audio system having a multiple compact disks (CDs) players to play prerecorded audio programs such as music, news, discussions, advertisements, etc. The AMUX is connected to a corresponding CIC through a communication pathway carrying control and monitor signals from host processor 12. Each CD on an AMUX corresponds to an audio channel. A passenger can select the desired audio channel from the CDs at his or her seat. Typical control and/or monitor operations for the AMUX include the selection of a particular track on a particular CD, the control of volume, the selection of filtering frequencies for sound enhancement, etc.

The SVDU is the retractable overhead video monitor. The SVDU displays the selected video programs from the VRU. The control operations of the SVDU include selection of the video input channel, color enhancement, monitor deployment, monitor power control, etc. These operations are performed through the communication pathway connecting the SVDU with the corresponding CIC.

The control and monitor operations are carried out by the transfer of messages between host processor 12 and these external devices through the CICs.

These messages are stored in a multiported RAM coupled to host processor 12 and microcontroller 50. In this embodiment, a DPRAM is shown for clarity. DPRAM 40 interfaces with host processor 12 through main processor bus 20, and interfaces with microcontroller 50 through separate private bus 41. In the present embodiment, private bus 41 is implemented though the Input/Output port lines of microcontroller 50. The objective of using a private bus is to avoid contention with microcontroller bus 60. Microcontroller 50 is interfaced to DPRAM 40 through bus 41 and to CICs $25_1$ to $25_N$ through microcontroller bus 60. Examples of the CICs used are the Dual UART (Part No. SC26C92) and Quad UART (Part No. SC2694) manufactured by Philips Semiconductor in Pleasanton, Calif. Microcontroller 50 may be any microprocessor configured for embedded applications. In the present embodiment, an industry standard 8751-type microcontroller, such as the 8751 manufactured by Intel Corporation in Santa Clara, Calif., is used. In this arrangement, external devices, or the Passenger Seat Units $26_1$ through $26_N$ (e.g. the VRUs, AMUX, SVDU), are connected to CICs $25_1$ through $25_N$, respectively, through appropriate communication pathways such as the RS-485 interface. Microcontroller 50 controls these CICs in place of host processor 12. The control mechanism can be either interrupt-based or polling-based. Since microcontroller 50 is dedicated to interfacing to CICs $25_1$ through $25_N$, host processor 12 is now relieved of the burden of low-level operations such as initialization, reading and writing data to the CICs. The messages to be exchanged between host processor 12 and external devices will be stored and buffered in dual-ported RAM 40.

Figure 2:
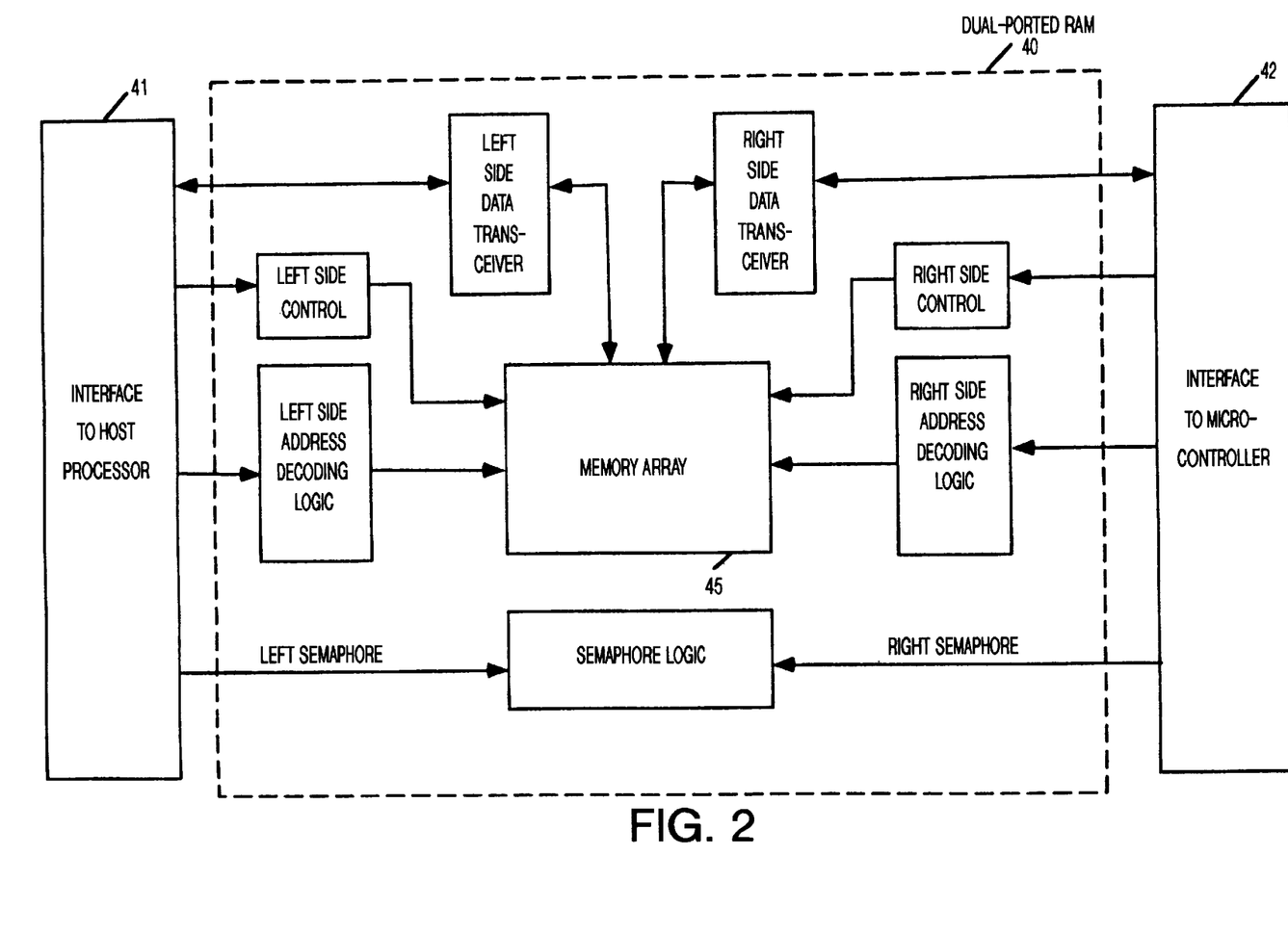
FIG. 2 shows the organization of an exemplary dual-ported random access memory.

FIG. 2 shows a detailed organization of dual-ported RAM 40. Dual-ported RAM 40 has two interfacing sections 41 and 42. In this embodiment, interface section 41 is coupled to host processor 12 and interface section 42 is coupled to microcontroller 50. Each section consists of a set of control, address and data signals. RAM 45 is accessible to both sections 41 and 42.

In this embodiment, the DPRAM is a 4 K×8 device manufactured by Integrated Device Technology (IDT) in Santa Clara, Calif., Part No. IDT71342SA/LA. The DPRAM has 8 address locations in addition to 4K×8 RAM dedicated to binary semaphore flags. The semaphore logic is a set of eight latches which are independent of random access memory (RAM) 45. These latches can be used to pass a flag, or token, from one port to the other to indicate that a shared resource is in use. In this application, the shared resource here refers to a portion of RAM 45. The semaphores provide a hardware assist for a use assignment method called "Token Passing Allocation." In this method, the state of a semaphore latch is used as a token indicating that a shared resource is in use. For example, if microcontroller 50 wants to use a section of RAM 45, it requests the token by setting a corresponding latch that has been assigned for this section of RAM 45. Microcontroller 50 then verifies its success in setting the latch by reading it. If microcontroller was successful, it proceeds to assume control over that section of RAM 45 either by reading or writing. If it was not successful in setting the latch, the microcontroller determines that host processor 12 had set the latch first, has the token and is using that section of RAM 45. Microcontroller 50 can then either repeatedly request that semaphore's status or perform some other tasks and occasionally attempt again to gain control for the token via the test and set sequence. Once host processor 12 has relinquished the token, microcontroller 50 should succeed in gaining control.

Figure 3:
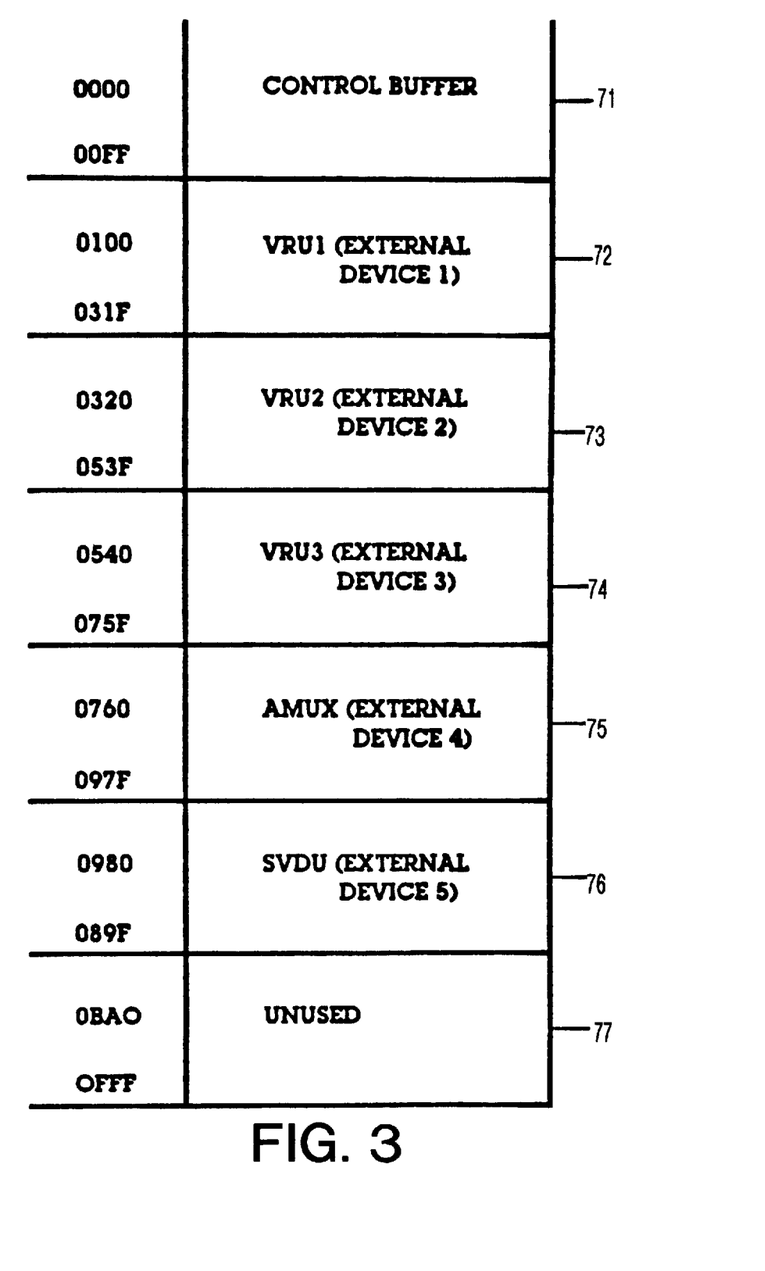
FIG. 3 is a flowchart to explain the process in which the communication board processes the messages to and from the host processor.

FIG. 3 shows a typical organization of the memory map of the DPRAM 40. In this embodiment, the size of RAM 45 is 4 KB. The 4 KB of RAM 45 is partitioned into sections: Control Buffer 71 stores control parameters for each UART. These parameters may include data rate (e.g., 9.6 kbps, 100 kbps), number of data bits (e.g., 5 to 8 bits), parity type, number of stop bits. Additionally, Control Buffer 71 may store other information such as host interrupt acknowledgment, interrupt ID code for each UART, flag indicating whether data is ready from host processor 12, etc. Buffer Sections 72 through 76 store the messages sent by host processor 12 or corresponding external device. In the present embodiment, 6 external devices and therefore 6 buffer sections are used: VRU1, VRU2, VRU3, AMUX, and SVDU. Buffer Section 77 is not used and reserved for future expansion.

Figure 4:
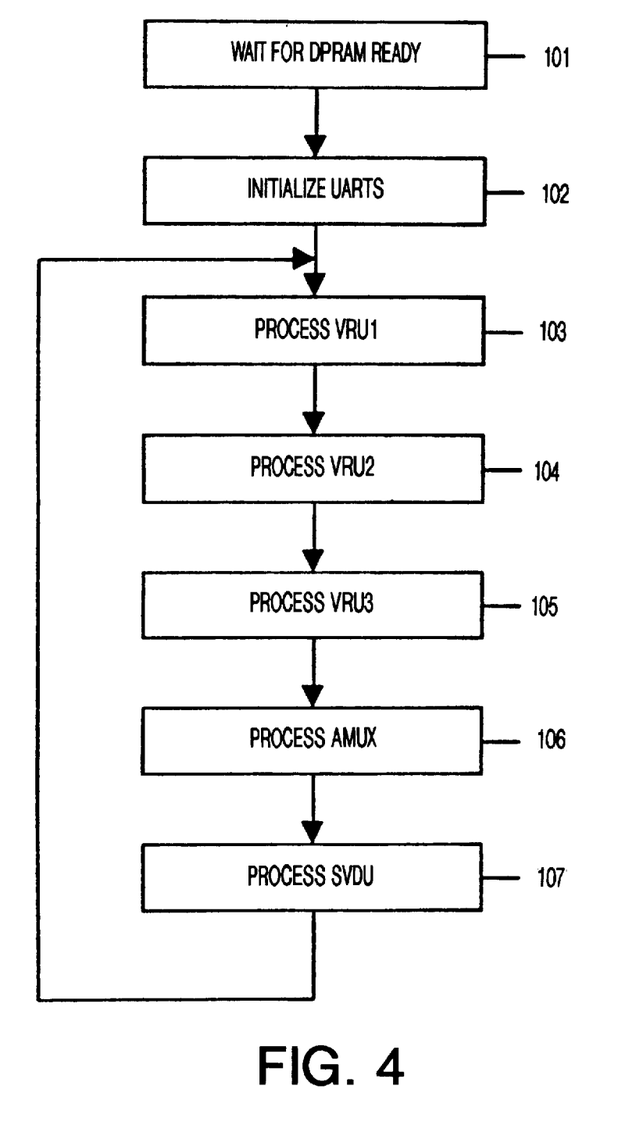
FIG. 4 is a flowchart to explain the process in which the microcontroller handles each Communication Interface Controller (CIC).

FIG. 4 is a flowchart illustrating the interactions of microcontroller 50 to with DPRAM 40 and the UARTs $25_1$ through $25_N$.

At step 101, the microcontroller waits for the DPRAM to be ready. At step 102, the microcontroller initializes all the UARTs by writing the parameters read from the Control Buffer to each UART. Before reading the Control Buffer, the microcontroller checks a semaphore to determine if the DPRAM is free. If the DPRAM is not free, then the microcontroller has to wait. If it is free, the microcontroller sets the semaphore to lock the DPRAM from being accessed by the host processor. The microcontroller proceeds to read the UART control parameters from the control buffer and write to appropriate UARTs. After all the UARTs are initialized, the microcontroller unlocks the DPRAM to allow the host processor to access the DPRAM. The process of checking the semaphore, locking and unlocking the semaphore is carried out every time the microcontroller accesses the DPRAM.

At steps 103 through 107, the microcontroller services each UART. The servicing can be done by polling as shown or by any other schemes including interrupt. The microcontroller goes into an indefinite loop in servicing these UARTs. The typical servicing of a UART is shown by the flowchart of FIG. 5.

Figure 5:
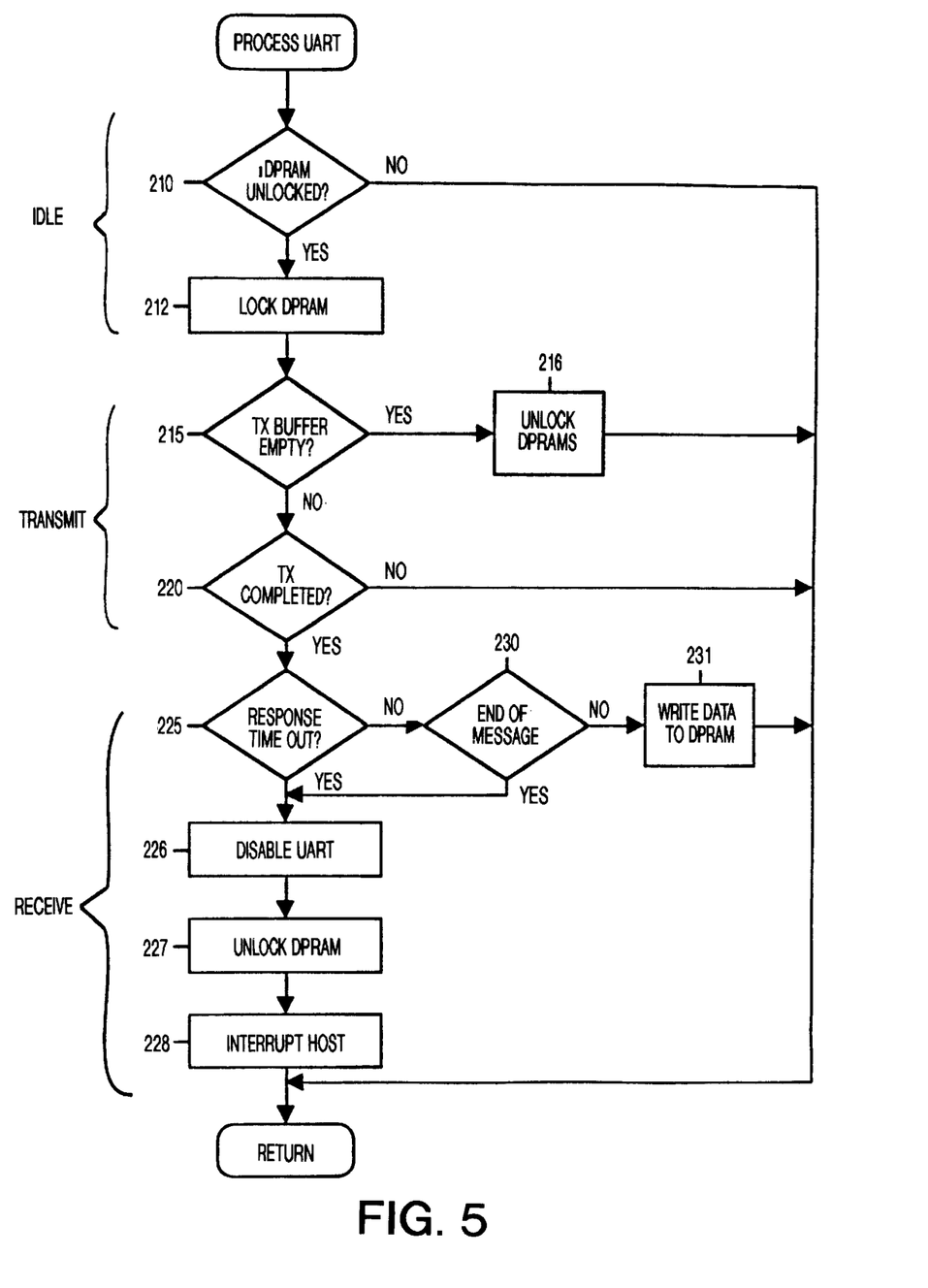
FIG. 5 is a flowchart to show how the microcontroller services a Communication Interface Introller (CIC).

FIG. 5 is a flowchart showing the servicing of a typical external device through its associated UART. For each UART, there are essentially 3 states: idle, transmission (Tx state), and reception (Rx state). The flowchart shows the process starts from idle state, then Tx state, followed by Rx state. However, the order is not important and persons skilled in the art will know that any order can be used. At step 210, it is determined if the DPRAM is free by checking the semaphore. If not, control returns to step 210 to wait until the DPRAM is free. If the DPRAM is free, the microcontroller will assert control by locking DPRAM at step 212. At step 215, the status of the UART is checked to determine if the transmitter (Tx) buffer inside the UART is empty. If the Tx buffer is empty, signifying transmission of a particular byte is complete, control unlocks DPRAM at step 216 and returns. If the Tx buffer is not empty, signifying that the UART transmission is in progress, the microcontroller determines if the transmission is complete, at step 220. If the transmission is not complete, control returns and the microcontroller continues to read data from the dual-ported RAM to write to UART. If the transmission is complete, the microcontroller enters the Rx state by first determining if the timer has timed out, at step 225. If the timer has timed out, the UART is disabled at step 226, the DPRAM is unlocked at step 227, an interrupt is generated to the host processor at step 228, and control returns. If the timer has not timed out, the microcontroller determines whether the end of the message has been reached at step 230. If the end of the message has not been reached, the microcontroller writes the data to the dual-ported RAM at step 231 and control returns. If it is the end of the message, the UART is disabled at step 226, the DPRAM is released (unlocked) at step 227, and an interrupt is generated to the host processor at step 228 to inform the host processor that a message has been deposited and is ready to be read by the host processor. Control then returns.

Variations of the above sequence in servicing the UARTs are contemplated for other CICs or UARTs because each external device has different characteristics and attributes requiring different handling operations.

When the microcontroller reads data from the DPRAM to write to the UART, the data may have to be processed before sending the data to the UART. Typical processing operations include error encoding and the generation of a header and a trailer, as explained below. Similarly, when the microcontroller reads data from the UART and before writing to the DPRAM, the microcontroller may have to decode errors and strip header/trailer information at the appropriate segments of the received message. By delegating the microcontroller to perform these ancillary tasks, the host processor can be free to perform other tasks.

Figure 6A:
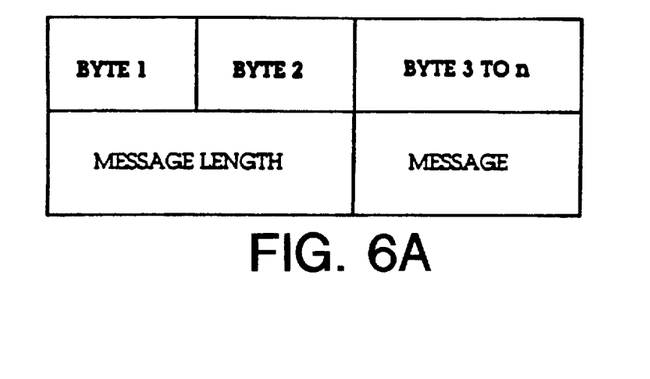
FIGS. 6(a) and 6(b) are an illustrations of the format of the communication messages.
Figure 6B:
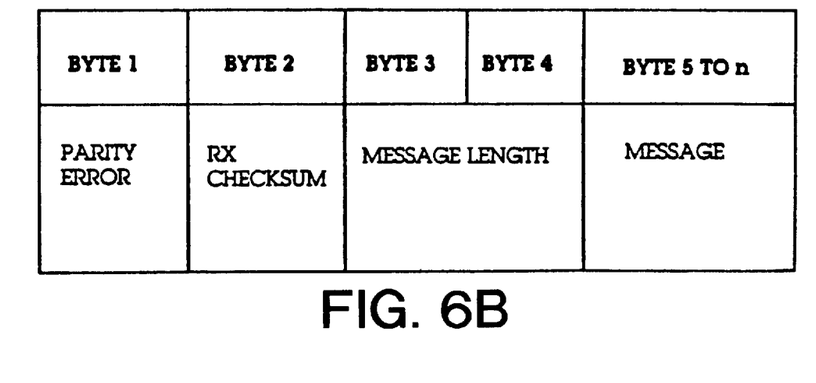

FIGS. 6(a) and 6(b) show formats of messages transmitted by the host processor or received from the communication interface controllers (CICs). These formats are merely illustrative in showing the low-level operations that the microcontroller can perform to relieve the burden from the host processor.

FIG. 6(a) shows the format of a typical message sent by the host processor to the DPRAM. It is assumed that the total number of bytes is n. Byte 1 and byte 2 are used to indicate the message length. The message length can be measured in terms of the number of bytes contained in the actual message, or any standardized unit of measure. The message length can be used in a number of ways. One is to serve as error checking device. Another is to serve as a loop counter for reading data from the DPRAM. In the present embodiment, checksum information is not included for simplicity. However, it is readily apparent that any useful information can be included. When the microcontroller reads the data from the DPRAM, it reads the first two bytes to determine the message length. Then it reads the actual message. If checksum information is included for error checking purpose, the microcontroller computes the checksum while reading the data from the DPRAM. The microcontroller reads one byte at a time and sends each byte to the corresponding CIC. At the end of the transmission of the message, the microcontroller compares the two checksums to determine if they are the same. If they are different, an error condition exists and an error handling routine can be invoked. Otherwise, the message is assumed to be received correctly and the process continues as usual.

FIG. 6(b) shows the format of a typical message sent by the CIC. For the CIC, or the UART preferably used, additional information is typically involved. In the present embodiment, Byte 1 is used for reporting parity error. Byte 2 is used for checksum information. Bytes 3 and 4 are used for message length. Byte 5 through byte n are for the actual message. Most UARTs have the ability to perform error checking and report the detected error by setting corresponding status bits. For example, parity error can be checked by the UART independently of the microcontroller. When the microcontroller reads the data from the UART receiver buffer, it checks the UART status bit to determine if there is any parity error. If there is a parity error, the microcontroller reports it in Byte 1 of the message to be stored in the DPRAM. If there is no parity error, the microcontroller proceeds normally. The checksum is also computed and included in Byte 2. This checksum information is used by the host processor to determine if there is any error during the transfer of data to and from the DPRAM. The microcontroller also computes the message length to be reported in bytes 3 and 4. As discussed earlier, the message length can be used by the host processor as an additional error checking device or as a loop counter for reading data from the DPRAM.

The checking for error, reporting error, computing checksum and message length are some examples of the low-level operations that the microcontroller has to perform to enhance the reliability and to speed up the processing of the communication messages. Other low-level operations may be necessary such as message identification code, time stamping, priority level, information header and trailer, etc.

The management of the communication message exchanges is further facilitated by the use of status information to inform the status of the messages in the DPRAM. In the present embodiment, the host processor is referred to as the master and the microcontroller is referred to as the slave. This designation is merely for convenience and is not intended as a functional designation. Since messages may arrive at unpredictable times, it is useful for the host processor not to be disrupted while the message is being assembled and processed. This is especially significant when the data rates of the communication messages are much slower than the processing rate of the host processor. The microcontroller, acting as a slave processor, processes the complete message and write to the appropriate DPRAM locations. When the message is ready to be received by the master host processor, the slave microcontroller sends a status bit to the host processor. The host may read this slave status bit any time it is ready to access the message. In the present embodiment, an interrupt scheme is used, Similarly, when the host processor, acting as a master, sends a message to the DPRAM, it alerts the slave microcontroller that a host message is available for reading by sending a master status bit. The slave microcontroller may read the master status bit any time it is free. In the present embodiment, the master status bit is implemented as an interrupt signal to the microcontroller upon a host write to an address. This exchange of status information allows the master host processor to focus on its tasks and not being concerned with processing the messages.

In addition to the exchange of status information through interrupts between the host processor and the microcontroller, there are also interrupt signals from the CICs to the microcontroller. In the present embodiment, several interrupt signals from the UARTs are tied together and connected to the interrupt input to the microcontroller. When the microcontroller is interrupted, it polls, i.e. reads the status bits of, each UART to determine which one is generating the interrupt and services the interrupt request accordingly. By allowing the UARTs to interrupt the microcontroller rather than the host processor, the host processor is freed of frequent interrupts from external devices.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. In a computer system used in an aircraft in-flight entertainment system (IFES) having a host processor coupled to a host bus and a plurality of communication interface controllers (CICs) coupled to a plurality of external devices, a communication subsystem comprising:
   a multi-ported random access memory (MPRAM) coupled to said host bus, said MPRAM storing at least a plurality of messages from said host processor and from said external devices;
   a microcontroller coupled to said MPRAM through a local bus and to said plurality of CICs via a microcontroller bus, said microcontroller processing and transferring said messages from said MPRAM to said CICs and from said CICs to said MPRAM asynchronously with and independently from said host processor; and
   a semaphore structure coupled to the MPRAM, the microcontroller, and the host processor for controlling an access to said MPRAM from the microcontroller and the host processor.

2. The communication subsystem of claim 1 wherein said MPRAM is a dual-ported RAM (DPRAM).

3. The communication subsystem of claim 1 wherein said CICs are Universal Asynchronous Receiver and Transmitter (UARTs).

4. The communication subsystem of claim 1 wherein said host processor generates a master status information to said microcontroller upon a successful access to said MPRAM.

5. The communication subsystem of claim 1 wherein said microcontroller generates a slave status information to said host processor upon a successful access to said MPRAM.

6. The communication subsystem of claim 4 wherein said master status information includes an interrupt asserted by said host processor.

7. The communication subsystem of claim 5 wherein said slave status information includes an interrupt asserted by said microcontroller.

8. The communication subsystem of claim 1 wherein said semaphore structure further comprises:
   at least one flag corresponding to a memory section;

setting means for setting said at least one flag to indicate that said memory section is unavailable for said access;

resetting means for resetting said at least one flag to indicate that said memory section is available for said access; and determining means for determining if said memory section is available for said access.

9. The communication subsystem of claim 8 wherein said microcontroller accesses said memory section if said determining means indicates that said memory section is available for said access.

10. The communication subsystem of claim 8 wherein said microcontroller is prohibited from accessing said memory section if said determining means indicates that said memory section is unavailable for said access.

11. The communication subsystem of claim 8 wherein said host processor accesses said memory section if said determining means indicates that said memory section is available for said access.

12. The communication subsystem of claim 8 wherein said host processor is prohibited from accessing said memory section if said determining means indicates that said memory section is unavailable for said access.

13. A method of providing efficient communication between a host processor coupled to a host bus and a plurality of external devices through a plurality of communication interface controllers (CICs), said method comprising steps of:

storing at least a plurality of host messages from said host processor and a plurality of external messages from said external devices in a multi-ported RAM (MPRAM);

processing said host messages and said external messages asynchronously with and independently from said host processor;

controlling said CICs by a microcontroller, said microcontroller being coupled to said MPRAM through a local bus and to said plurality of CICs via a microcontroller bus;

controlling an access to said MPRAM from the microcontroller and the host processor by a semaphore structure; and sending a status information to said host processor and said microcontroller.

14. The method of claim 13 wherein said step of accessing said MPRAM further comprises steps of:

determining a status of a semaphore;

changing said status of said semaphore to indicate that said MPRAM is unavailable for access if said status of said semaphore prior to said changing indicates that said MPRAM is available for access;

pending an access to said MPRAM if said status indicates that said MPRAM is unavailable for access;

reading said host messages from said MPRAM if said status indicates that said MPRAM is available for access; and writing said external messages from said external devices to said MPRAM if said status indicates that said MPRAM is available for access.

15. The method of claim 13 wherein said processing step further comprises steps of:

encoding an error information to said host messages and said external messages;

appending at least one of a header/trailer information to said host messages and said external messages;

decoding said error information from said host messages and said external messages; and removing said at least one of said header information and said trailer information from said external messages.

16. The method of claim 15 wherein said error information includes at least one of parity error and checksum.

17. The method of claim 15 wherein said header/trailer information includes at least one of message length, message identification codes, time stamp and priority level.

18. The method of claim 13 wherein said step of controlling said CICs further comprises steps of:

initializing said CICs;

writing said host messages from said MPRAM to said CICs; and obtaining said external messages from said CICs.

19. The method of claim 13 wherein said step of sending a status information includes generating an interrupt signal.

* * * * *

UNITED STATES PATENT AND TRADEMARK OFFICE
CERTIFICATE OF CORRECTION

PATENT NO. : 5,881,228
DATED : March 9, 1999
INVENTOR(S) : Atkinson, et al.

It is certified that error appears in the above-indentified patent and that said Letters Patent is hereby corrected as shown below:

In column 1 at line 29 insert --such-- after "functions,"

Signed and Sealed this

Ninth Day of November, 1999

Attest:

Attesting Officer

Q. TODD DICKINSON

Acting Commissioner of Patents and Trademarks